Dec. 17, 1968    J. H. KOEGEL    3,417,270
STEPPING MOTOR AND CONTROL MEANS
Filed Feb. 11, 1966    7 Sheets-Sheet 1

INVENTOR
James H. Koegel
BY Birch and Birch
ATTORNEYS

Dec. 17, 1968   J. H. KOEGEL   3,417,270
STEPPING MOTOR AND CONTROL MEANS
Filed Feb. 11, 1966   7 Sheets-Sheet 2

INVENTOR
James H. Koegel
BY Birch and Birch
ATTORNEYS

FIG. 4.

| STABLE STATE | MOTOR INPUT TERMINALS | | | |
|---|---|---|---|---|
| | 34a | 34a' | 34b | 34b' |
| | MOTOR INPUT SIGNALS | | | |
| | A | $\bar{A}$ | B | $\bar{B}$ |
| 1 | 0 | 1 | 0 | 1 |
| 2 | 1 | 0 | 0 | 1 |
| 3 | 1 | 0 | 1 | 0 |
| 4 | 0 | 1 | 1 | 0 |

INVENTOR
James H. Koegel

BY Birch and Birch
ATTORNEYS

INVENTOR
James H. Koegel
BY Birch and Birch
ATTORNEYS

Dec. 17, 1968  J. H. KOEGEL  3,417,270

STEPPING MOTOR AND CONTROL MEANS

Filed Feb. 11, 1966  7 Sheets-Sheet 7

INVENTOR
James H. Koegel

BY *Birch and Birch*

ATTORNEYS

United States Patent Office 3,417,270
Patented Dec. 17, 1968

3,417,270
STEPPING MOTOR AND CONTROL MEANS
James H. Koegel, Placentia, Calif., assignor to Robertshaw Controls Company, Richmond, Va., a corporation of Delaware
Filed Feb. 11, 1966, Ser. No. 526,829
17 Claims. (Cl. 310—49)

This invention relates to electric stepping motors and more particularly, to direct current stepping motors of the rotary type in which an input pulse of direct current to the motor results in a corresponding step (quantized) motion output of the motor.

It is an object of this invention to provide new and novel electric stepping motor structures for effecting rotary stepped motion outputs in response to direct current inputs.

It is another object of this invention to provide new and novel electric stepping motor structures of the direct current permanent magnet type which are of simpler construction, of lower cost and which have a longer useful life than conventional motor structures.

Another object of this invention is to provide new and novel electric stepping motor structures of the direct current permanent magnet type which obviate the need for a commutator means and which, as a result are explosion proof.

Still another object of this invention is to provide novel rotary and linear electric stepping motors as compatible direct output terminal control means for modern digital computer control systems.

Still another object of this invention is to provide new and novel stepping actuator means comprising electric stepping motor structures and integral control means for same.

Yet another object of this invention is to provide rotary and novel rotary stepping motor structures of the permanent magnet type having optimized speed-torque performance characteristics.

Yet another object of this invention is to provide rotary stepping motor structures having new and novel winding and magnetic circuit configurations therein.

A further object of this invention is to provide a new and novel driver circuit for permanent magnet stepping motors providing commutated output current pulses corresponding to a digital input signal to such a motor in the form of a stream of pulses.

Further objects of this invention are to provide a new and novel driver circuit for permanent magnet stepping motors operated in response to digital input pulses including new and novel memory means maintaining the output of the driver circuit in a fixed state for an indefinite period of time subsequent to the reception of one input pulse has been received by the said driver circuit until a subsequent input pulse has been received; and further, wherein said memory means is effected by an optimally minimum number of components.

A still further object of this invention is to provide a new and novel driver circuit for permanent magnet stepping motors adapted for operation from an input signal comprising a function of a time-duration contact closure, wherein an internally generated pulse stream will be gated by such a contact closure for a predetermined period of time, said period of time being determined by the desired angular rotational response to the input constraint of the stepping motors being controlled and the frequency of the said internal pulse stream.

Yet a further object of this invention is to provide a new and novel driver circuit for permanent magnet stepping motors adapted for operation from an input signal comprising a function of a time-duration contact closure, wherein a pulse stream derived from an alternating current power supply at the same or double frequency thereof will be gated by such contact closure for a predetermined period of time, said period of time being determined by the desired angular rotational response to the input constraint of the stepping motors being controlled and the power frequency being utilized.

These and other objects of this invention will become more fully apparent with reference to the following specification and drawings which relate to a preferred embodiment of the invention.

*Embodiment I*

Figure 1:
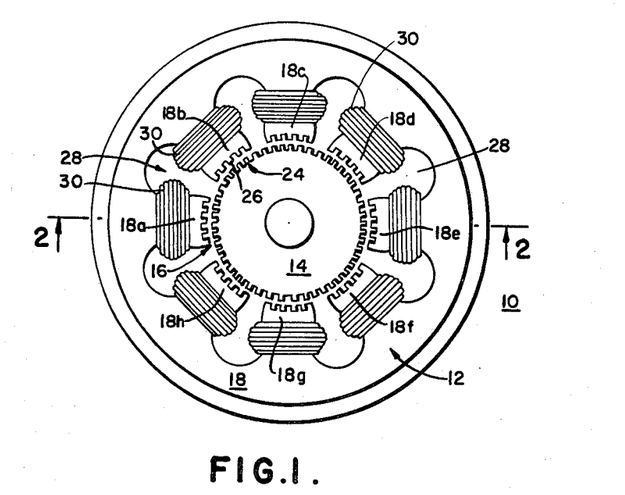
FIGURE 1 is an end view of a stepping motor of the present invention.
Figure 2:
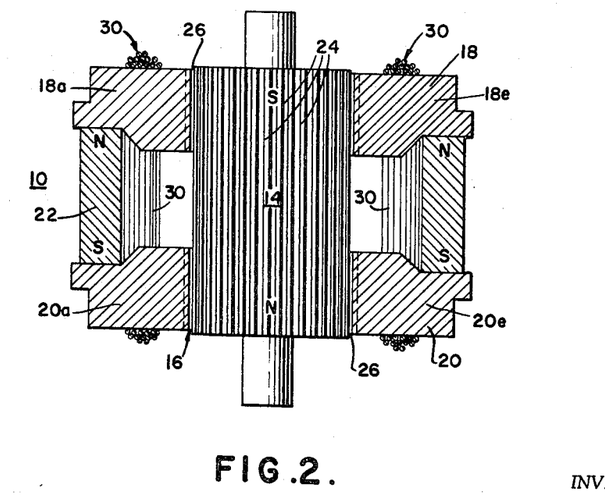
FIGURE 2 is a cross-section taken along line 2—2 of FIGURE 1.

Referring in detail to the drawings and more particularly to FIGURES 1 and 2, a first embodiment of the stepping motor 10 of the subject invention will now be described.

The motor 10 generally comprises a stator 12 and an internally concentric rotor 14 having an air gap 16 therebetween.

The stator 12 is comprised of first and second coaxial cylindrical pole pieces 18 and 20, separated by a mutually juxtaposed and coaxial, cylindrical, permanent magnet 22 having its north and south poles N and S adjacent the first and second pole pieces 18 and 20, respectively.

The pole pieces 18 and 20 are divided into eight salient poles 18a, 18b, 18c, 18d, 18e, 18f, 18g, 18h and 20a, 20b, 20c, 20d, 20e, 20f, 20g and 20h, respectively.

The rotor 14 and each of the poles 18a . . . 18h and 20a . . . 20h are provided with a plurality of teeth adjacent the air gap 16. The rotor teeth 24 comprise the lands between a plurality of parallel, axially extending, peripheral grooves of equal angular spacing. The stator teeth 26 are also axially extending and parallel and have the same angular spacing across each of the poles 18a . . . 18h and 20a . . . 20h as do the rotor teeth 24.

Each of the said poles 18a . . . 18h and 20a . . . 20h are separated by radial winding slots 28, the said poles thus being radially extending and acting as support means for windings 30, the latter to be hereinafter more fully described. Each of the said salient poles include an equal incremental number of stator teeth 26 identically placed thereon while the entire periphery of the rotor 14 is comprised of equally spaced rotor teeth 24.

Since corresponding ones of the salient poles 18a . . . 18h and 20a . . . 20h of the stator pole pieces 18 and 20, respectively, are axially aligned in all respects, the following description of the elements of the first pole piece 18 also apply to the corresponding elements of the second pole piece 20.

The salient poles 18a . . . 18h are arranged in complementary pairs such that in any given stable state or position of operation (to be hereinafter more fully defined), the stator teeth 26 on one diametrically opposed pair of the salient poles 18a . . . 18h are fully aligned with the rotor teeth 24; the stator teeth 26 on a second diametrically opposed pair of said salient poles are fully aligned with the grooves between the rotor teeth 24; and the stator teeth 26 on each of the two remaining diametrically opposed pairs of said salient poles are one-half (½) aligned with the rotor teeth 24.

For example, in the operative position of FIGURE 1, the salient poles 18d and 18h have stator teeth 26 aligned with the rotor teeth 24; salient poles 18b and 18f have stator teeth 26 aligned with the grooves between the rotor teeth 24; and the pole pairs 18c–18g and 18a–18e have stator teeth 26 one-half (½) out of alignment with the rotor teeth 24, the former leading and the latter lagging the rotor teeth 24, or vice-versa, depending on the direction of rotation to be next initiated.

Figure 3:
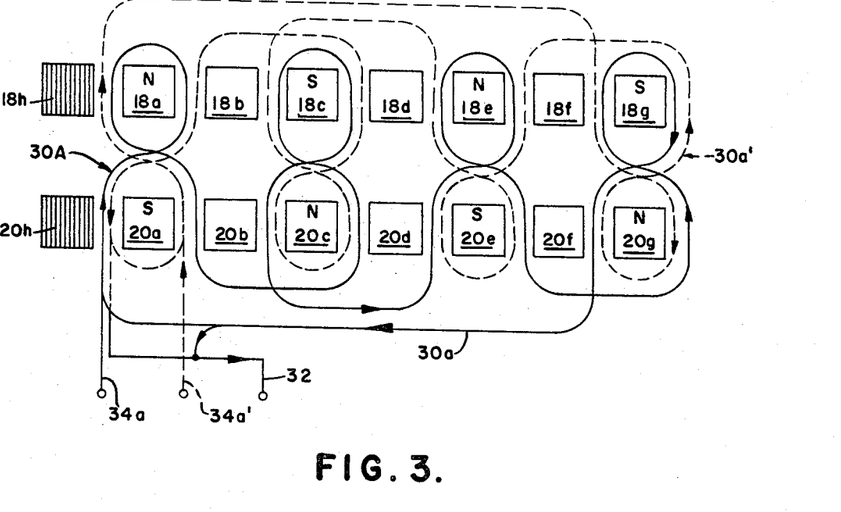
FIGURE 3 is a schematic diagram of the windings and related magnetic pole configurations of the present invention.
Figure 4:
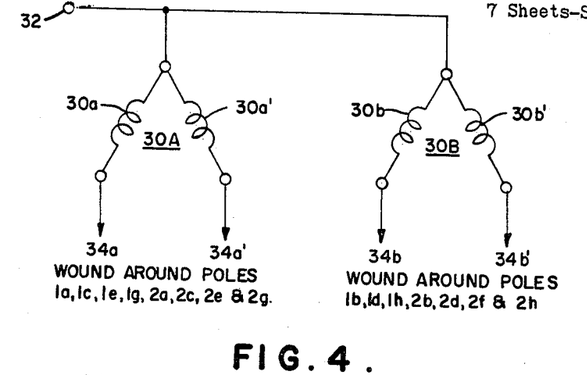
FIGURE 4 is a schematic of the winding interconnections of the present invention.

Referring additionally to FIGURES 3 and 4, the windings 30 will now be more fully described.

The salient poles 18a . . . 18h and 20a . . . 20h are schematically shown in FIGURE 3 as parallel linear arrays of square blocks as if the stator 12 had been split and unrolled to expose the faces thereof adjacent rotor 14.

Two sets of windings 30A and 30B are provided, comprising, respectively, pairs of skeins 30a–30a' and 30b–30b', all four of said skeins having a common terminal lead 32 and said pairs of skeins, at their unconnected ends, being provided with electric terminals 34a–34a' and 34b–34b', respectively.

Since the windings 30A and 30B are wound in like manner on first and second salient pole groups, respectively, the description of the winding 30A on the first pole group comprising the salient poles 18a–18c–18e–18g and 20a–20c–20e–20g is directly applicable to the winding 30B and its relationship with the second pole group comprising the salient poles 18b–18d–18f–18h and 20b–20d–20f–20h.

The winding 30A is wound such that in the first pole group axially adjacent salient poles 18a–20a, 18c–20c, 18e–20e and 18g–20g are of opposite magnetic polarity and peripherally alternate poles 18a–18c–18e–18g and 20a–20c–20e–20g also of opposite polarity. Skeins 30a and 30a' are wound in the opposite sense on each and every pole of the said first pole group 23 shown by the arrowheads, respectively, placed thereon in FIGURE 3 to indicate the direction of current flow therethrough, when energized.

Skeins 30a and 30b are wound in the same sense on their respective salient poles while skeins 30a' and 30b' are also wound in the same sense on their respective salient poles.

Figure 5:
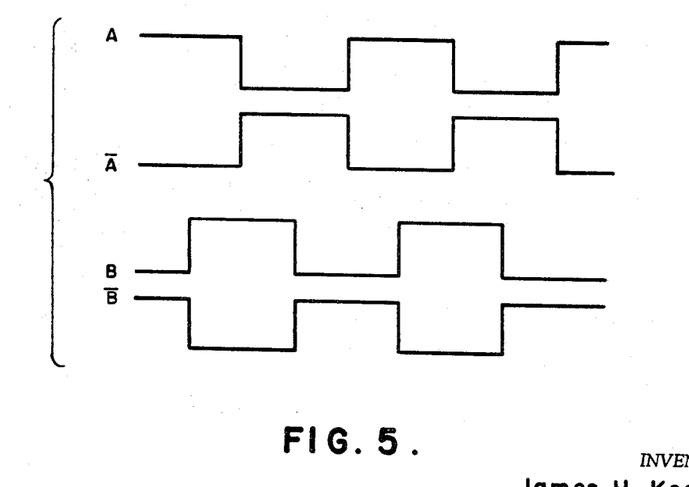
FIGURE 5 is a schematic representation of exemplary energizing input signals for the present invention.

As shown in FIGURE 5, there are first, second, third and fourth input signals A, $\overline{A}$, B and $\overline{B}$ adapted to be applied to input terminals 34a, 34a', 34b and 34b', respectively. Signals A and $\overline{A}$ comprise equal pulse width and amplitude square wave current signals which are 180° out of phase. Signals B and $\overline{B}$ further comprise equal pulse width and amplitude square wave current signals which are 180° out of phase. Further, signals A and B are phase shifted 90° with respect to one another as are signals $\overline{A}$ and $\overline{B}$.

Suitable driver circuit means to be hereinafter more fully described is provided for generating the input signals A, $\overline{A}$, B and $\overline{B}$.

*Operation*

With reference to FIGURES 1, 2, 3, 4, 5 and 6, the operation of the illustrated embodiment of the present invention will now be described.

Figure 6:
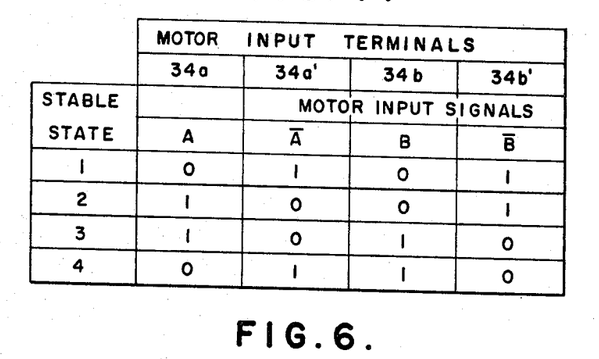
FIGURE 6 is a chart of the energization and polarity sequence of the stepping motor of the present invention.

As indicated in FIGURE 6, four stable operating states are possible in the stepping motor 10, state 4 being illustrated in FIGURE 1 and comprising that stable state in which winding skeins 30a' and 30b are energized by input current signals $\overline{A}$ and B, respectively. As further indicated in FIGURE 6, the number of stable states of operation corresponds to the number of combinations effected by permutating the simultaneous energization of complementary pairs of winding skeins, comprising one winding skein in each pole group, by the respectively associated input current signals thereof.

If clockwise rotation reference FIGURE 1 is to be effected, the driver circuit must effect energization of the combination of winding skeins 30a and 30b, defined in FIGURE 6 as stable state 3, and hence, subsequent sequential energization of stable states 4, 3, 2, 1 . . . etc. for each clockwise step or quantum of rotation respectively effected.

Counterclockwise stepping is effected by reversal of the sequence, i.e., from stable state 4 to stable state 1 and thence, for each additional counterclockwise step or quantum of rotation stable states 2, 3, 4, 1 . . . etc., respectively.

In further explanation, a clockwise rotational step from the stable state 4 of FIGURE 1 is effected as follows:

The rotor 14 is magnetized in a fixed direction by the permanent stator magnet 22 as shown in FIGURE 2. Thus, when selected winding skeins in each of the two pole groups are energized, the respectively associated salient poles 18a . . . etc., are either in an aiding or opposing relationship with the magnetic field in the air gap 16.

When skeins 30a and 30b', representative of stable state 3 are energized with the stepping motor 10 having been in stable state 4, the fully aligned teeth 26 on the salient poles 18d, 18h, 20d and 20h will repel the rotor teeth 24; the completely misaligned teeth 26 on the salient poles 18b, 18f, 20b and 20f will attract the rotor teeth 24; the half-aligned teeth 26 on the salient poles 18a, 18e, 20a and 20e will attract the rotor teeth 24; and the half-aligned teeth 26 on the salient poles 18c, 18g, 20c and 20g will repel the rotor teeth 24, whereby each of the rotor teeth 24 will be constrained to seek the next adjacent one of the stator teeth 26 in a clockwise direction of rotation.

The rotor 14 will thus be advanced one step or quantum or rotation in the clockwise direction and will remain in this position, constrained in stable state 3, until input current signals are applied to a combination of winding skeins representative of another stable state of the motor 10 other than that state having last been effected.

Embodiment II

Figure 7:
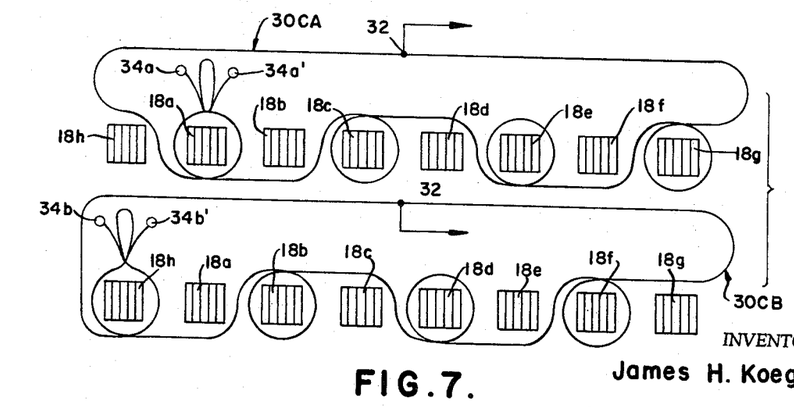
FIGURE 7 is a schematic of another embodiment of a winding configuration of the present invention.
Figure 8:
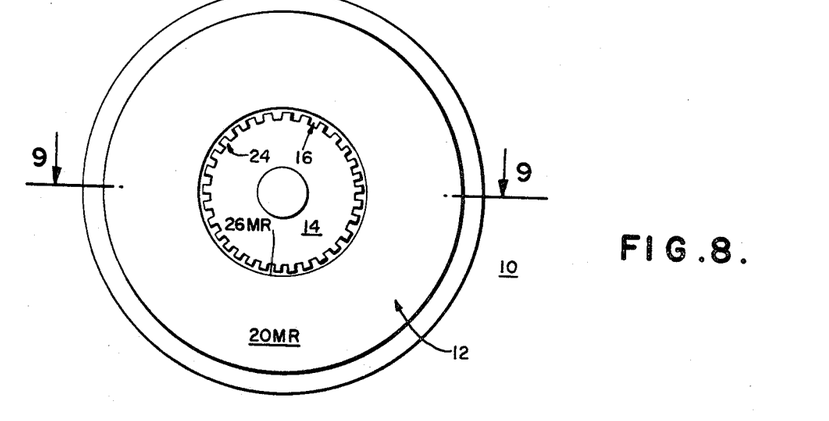
FIGURE 8 is an end view of a single pole piece embodiment of the present invention utilizing the winding configuration of FIGURE 7.
Figure 9:
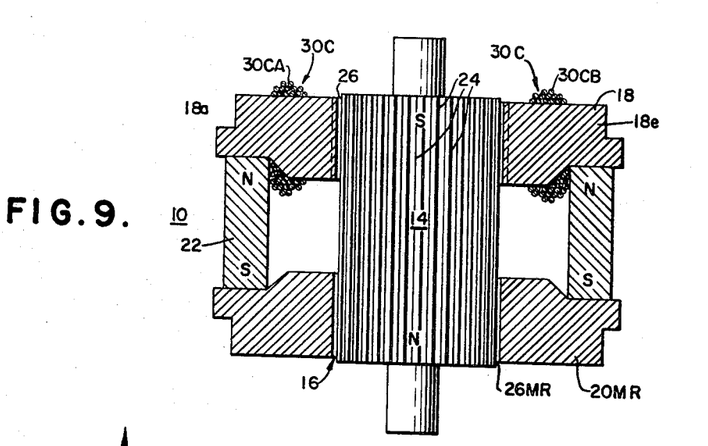
FIGURE 9 is a cross-section taken along line 9—9 of FIGURE 8.

Referring to FIGURES 7, 8 and 9, a second embodiment of the stepping motor 10 of the subject invention will now be described.

As specifically shown in FIGURES 8 and 9, the second pole piece 20 and its coresponding salient poles 20a . . . 20h are replaced by a generally cylindrical magnet flux return element 20–MR having a smooth annular surface 26–MR defining the outer boundary of the air gap 16 between the said flux return element 20–MR and the rotor 14. The first pole piece 18 and its associated salient poles 18a . . . 18h is as disclosed in the embodiment of FIGURES 1, 2 and 3. All other like parts in FIGURES 7, 8 and 9 to those of FIGURES 1, 2 and 3 bear like numerals.

The pole piece 18 is shown twice in FIGURE 7 as being wound with a stator winding 30C comprising in one illustration a first winding skein 30CA and in the other illustration a winding skein 30CB. The presentation of the pole piece 18 and its salient poles 18a . . . 18h is identical with that of FIGURE 3 and is separately shown with each of the winding skeins 30CA and 30CB for the sake of clarity, the said first and second skeins 30CA and 30 CB both being wound on the said first pole piece 18 on first and second salient pole groups 18a–18c–18e–18g and 18b–18d–18f–18h, respectively.

For each of the said winding skeins 30CA and 30CB alternate salient poles are wound to be energized to opposite magnetic polarities.

Figure 10:
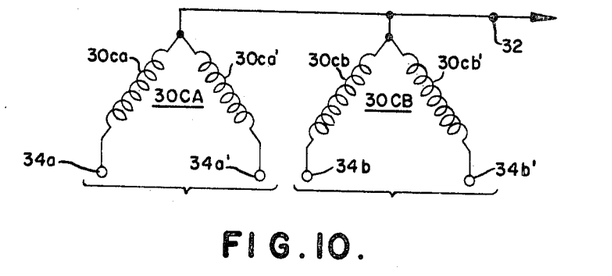
FIGURE 10 is a schematic diagram of the operational circuit connections for the embodiment of FIGURES 7, 8 and 9.

As shown in FIGURES 7 and 10, the first skein 30CA has a center tap 32 and first and second driver signal input terminals 34a and 34a' and the second winding skein 30CB has a center tap 32 and third and fourth driver signal input terminals 34b and 34b', respectively. The center taps 32 of both winding skeins comprise a common power input connection in the same manner as previously described and shown with reference to the embodiment of FIGURE 4.

Figure 11:
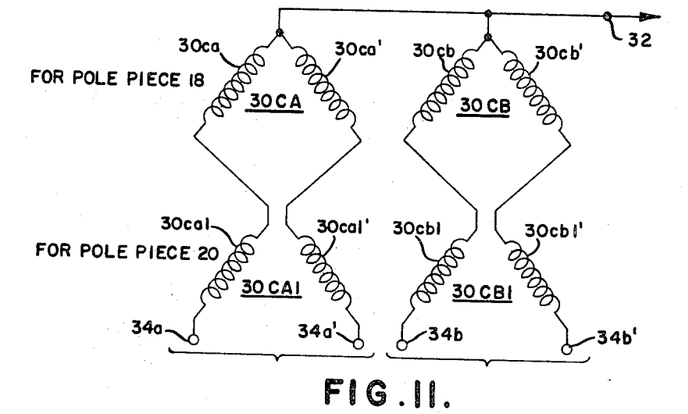
FIGURE 11 is a schematic diagram of the operational circuit connections of the windings of a stepping motor of the double pole piece type shown in FIGURE 2 wound in the configuration of FIGURE 7.

If two pole pieces such as 18 and 20 in the embodiment of FIGURES 1, 2, 3 and 4 are desired, the widing configuration of FIGURES 7 and 10 may be readily adapted thereto as shown in FIGURE 11.

Referring specifically to FIGURE 11, the first pole piece 18 is wound identically as described and shown with reference to FIGURES 7 and 10 and the second pole piece 20 is wound individually with third and fourth skeins 30CA1 and 30CB1, in the identical manner as the first and second skeins 30CA and 30CB are wound on the first pole piece 18. However, the third and fourth skeins now bear the driver signal input terminals 34a–34a' and 34b–34b', respectively, and are split at their center taps such that like halves of the first and second winding skeins 30CA and 30CB are in series with the respectively like halves of the third and fourth winding skeins 30CA1 and 30CB1 between the common center taps 32 and the said driver signal input terminals 34a, 34a', 34b and 34b'.

Further, the third and fourth skeins 30CA1 and 30CB1 are shifted on the pole piece 20 such that salient poles bearing the same subscripts on the first and second pole pieces 18 and 20 are respectively of opposite polarity.

Referring back to FIGURES 7 and 10, the first skein 30CA comprises first and second skein halves 30Ca and 30Ca' both wound on each and every pole in the first pole group 18a–18c–18e–18g while the second skein 30CB comprises third and fourth skein halves 30Cb and 30Cb' wound on each and every pole in the second pole group 18b–18d–18f–18h in the single pole piece embodiment of FIGURES 7, 8, 9 and 10. The said skein halves 30Ca, 30Ca', 30Cb and 30Cb' are adapted to be energized, respectively, through the driver signal input terminals 34a, 34a', 34b and 34b' by the driver input signals A, $\bar{A}$, B and $\bar{B}$, respectively, the latter having been previously described with reference to FIGURE 5.

Referring again to FIGURE 11, a symmetrically related winding configuration is presented wherein the third skein 30CA1 comprises fifth and sixth skein halves 30Ca1 and 30Ca' in series, respectively, with the first and second skein halves 30Ca and 30Ca'; and wherein the fourth skein 30CB1 comprises seventh and eighth skein halves 30Cb1 and 30Cb1' in series, respectively, with the third and fourth skein halves 30Cb and 30Cb'.

The first and fifth skein halves 30Ca and 30Ca1 are adapted to be energized through the first driver input terminal 34a; the second and sixth skein halves 30Ca' and 30CA1' are adapted to be energized through the second driver input terminal 34a'; the third and seventh skein halves 30Cb and 30Cb1 are adapted to be energized through the third driver input terminal 34b; and the fourth and eighth skein halves 30Cb' and 30Cb1' adapted to be energized through the fourth driver input terminal 34b'.

For both of the winding configurations of FIGURES 10 and 11, four stable states of energization for the stepping motor 10 are provided by selectively energizing the following driver terminal pairs:

Stable state 1—driver terminals 34a'—34b'
Stable state 2—driver terminals 34a—34b'
Stable state 3—driver terminals 34a—34b
Stable state 4—driver terminals 34a'—34b The operation of the embodiments of FIGURES 7, 8, 9, 10 and 11 is substantially identical with that of the embodiment of FIGURES 1 through 6, the selective sequencing of stable states of energization effecting either clockwise or counterclockwise rotation as desired or demanded by a driver input constraint.

The stepping motors 10 described above are capable of a wide range of operating speeds with sufficient torque output throughout said range and require minimal power inputs to achieve such speeds and torques.

Driver circuits

The driver circuit of the present invention will now be described with reference to FIGURE 12 and is shown as including a clockwise motor rotation signal input terminal CW and a counterclockwise motor rotation signal input terminal CCW, the said input terminals CW and CCW comprising the respective input terminals for first and second input amplifiers IA and IB, respectively.

The output stages of the driver circuit comprise first and second flip-flop circuits FFA and FFB, respectively, the said first flip-flop FFA having two stable signal output states A and $\bar{A}$ and the said second flip-flop FFB having two stable signal output states B and $\bar{B}$, the reference characters used to designate these output states being the conventional logical or Boolean algebra type.

Output state A comprises the driver signal A of FIGURE 5 and is applied to the first driver input terminal 34a of the stepping motor 10, the said terminal 34a also comprising a first output terminal of the first flip-flop FFA.

Output state $\bar{A}$ comprises the driver signal $\bar{A}$ of FIGURE 5 and is applied to the second driver input terminal 34a' of the stepping motor 10, the said terminal 34a' also comprising a second output terminal of the first flip-flop FFA.

Output state B comprises the driver signal B of FIGURE 5 and is applied to the third input terminal 34b of the stepping motor 10, the said terminal 34b also comprising a first output terminal of the second flip-flop FFB.

Output state $\bar{B}$ comprises the driver signal $\bar{B}$ of FIGURE 5 and is applied to the fourth input terminal 34b' of the stepping motor 10, the said terminal 34b' also comprising a second output terminal of the second flip-flop FFB.

First, second, third and fourth "AND" gates A1, A2, A3 and A4, respectively, are provided as a logical input network for the first flip-flop FFA. The first and second AND gates A1 and A2 are provided with a common output terminal 40A, the latter comprising a first input terminal to the first flip-flop FFA adapted to effect the output state A in the said flip-flop FFA at the first motor driver terminal 34A upon the receipt of a proper signal from the first and second AND gates A1 and A2. The third and fourth AND gates A3 and A4 are provided with a common output terminal 40$\overline{\text{A}}$, the latter comprising a second input terminal to the first flip-flop FFA adapted to effect the output state $\overline{\text{A}}$ in the said flip-flop FFA at the second driver terminal 34a' upon the receipt of a proper signal from the third and fourth AND gates A3 and A4.

Fifth, sixth, seventh and eighth AND gates B1, B2, B3 and B4, respectively, are provided as a logical input network for the second flip-flop FFB. The fifth and sixth AND gates B1 and B2 are provided with a common output terminal 40B, the latter comprising a first input terminal to the second flip-flop FFB adapted to effect the output state B in the said second flip-flop FFB at the third motor driver terminal 34b upon the receipt of the proper signal from the fifth and sixth AND gates B1 and B2. The seventh and eighth AND gates B3 and B4 are provided with a common output terminal 40$\overline{\text{B}}$, the latter comprising a second input terminal to the second flip-flop FFB adapted to affect the output state $\overline{\text{B}}$ in the said second flip-flop FFB at the fourth motor driver terminal 34b' upon the receipt of the proper signal from the seventh and eighth AND gates B3 and B4.

Each of the first, third, fifth and seventh AND gates A1, A3, B1, and B3, respectively, is provided with two signal input terminals, one of the latter being commonly connected to a first common signal bus 42A. The first common signal bus 42A comprises the output terminal of the first input amplifier IA and is adapted to receive amplified clockwise signal inputs received at the clockwise signal input terminal CW.

Each of the second, fourth, sixth and eighth AND gates A2, A4, B2 and B4, respectively, is provided with two signal input terminals, one of the latter being commonly connected to a second common signal bus 42B. The second common signal bus 42B comprises the output terminal of the second input amplifier IB and is adapted to receive amplified counter-clockwise signal inputs received at the counter-clockwise signal input terminal CCW.

The second one of the two signal input terminals of the first and fourth AND gates A1 and A4 are commonly connected through a first common junction 44 to the fourth motor driver terminal 34b'; the second one of the two signal input terminals of the second and third AND gates A2 and A3 are commonly connected through a second common junction 46 to the third motor driver terminal 34b; the second one of the two signal input terminals of the fifth and eighth AND gates B1 and B4 are commonly connected through a third common junction 48 to the first motor driver terminal 34a; and the second one of the two signal input terminals of the sixth and seventh AND gates B2 and B3 are commonly connected through a fourth common junction 50 to the second motor driver terminal 34a'.

Thus, a complete circuit diagram for setting and resetting the first and second flip-flops FFA and FFB in response to the various clockwise and counter-clockwise input signals at the input terminals CW and CCW, respectively, is provided, the signal output states A and $\overline{\text{A}}$ of the first flip-flop FFA being fed back to the third and fourth common junctions 48 and 50, respectively, at the fifth, sixth, seventh and eighth AND gates B1, B2, B3 and B4 as an input constraint for the second flip-flop FFB and the signal output states B and $\overline{\text{B}}$ of the second flip-flop FFB being fed back to the second and first common junctions 46 and 44, respectively, at the first, second, third and fourth AND gates A1, A2, A3 and A4 as an input constraint for the first flip-flop FFA.

Figure 12:
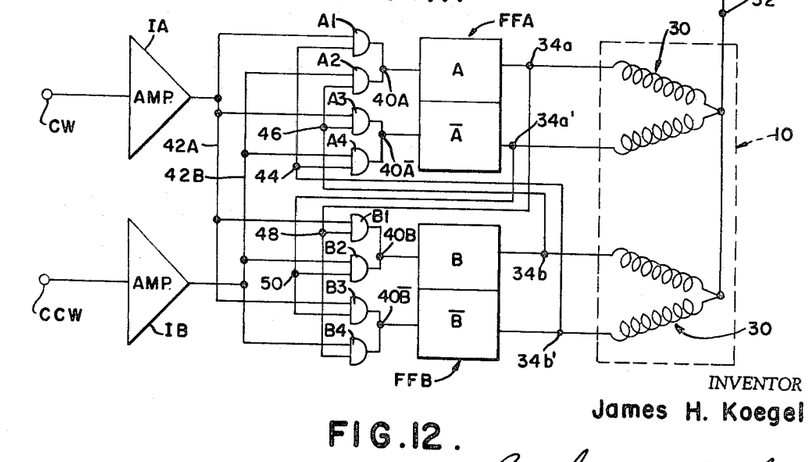
FIGURE 12 is a block diagram of a driver circuit of the present invention.
Figure 13:
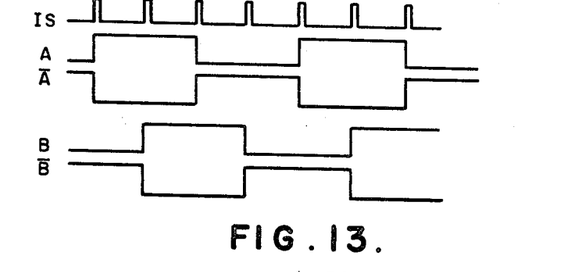
FIGURE 13 is a pulse waveform chart for the driver circuit of FIGURE 12.

Referring now to FIGURE 13, the synchronized pulse signal diagram for operation of the driver circuit of FIGURE 12 is shown, the input signal IS of the type to be applied to either of the clockwise or counter-clockwise input terminal CW or CCW, respectively, comprising a symmetrically spaced stream of rectangular pulses, the repetition rate of which determines the number of steps effected in the stepping motor 10 for a given time period and the duration of the pulse stream determining the amount of angular rotation effected by the stepping motor 10.

The motor driver signals A, $\overline{\text{A}}$, B and $\overline{\text{B}}$, as well as the initiation and termination of the respective driver signals in response to the input pulse stream IS are all shown in FIGURE 13.

For clockwise rotation, the following flip-flop output output signal states are gated to the AND gate output terminals by the input pulse streams IS applied to the input terminal CCW:

Terminal 40A—signal state $\overline{\text{B}}$
Terminal 40$\overline{\text{A}}$—signal state B
Terminal 40B—signal state A
Terminal 40$\overline{\text{B}}$—signal state $\overline{\text{A}}$ For clockwise rotation, the folowing flip-flop output signal states are gated to the AND gate output terminals by the input pulse stream IC applied to the input terminal CW:

Terminal 40A—signal state B
Terminal 40$\overline{\text{A}}$—signal state $\overline{\text{B}}$
Terminal 40B—signal state $\overline{\text{A}}$
Terminal 40$\overline{\text{B}}$—signal state A The following truth table illustrates the sequence of changes of state effected in the first and second flip-flops FFA and FFB, respectively, by selective gating of signals to the AND gate output terminals 40A, 40$\overline{\text{A}}$, 40B and 40$\overline{\text{B}}$ for both clockwise and counter-clockwise rotation.

| Desired sequence | | CCW rotation | | | | CW rotation | | | |
| --- | --- | --- | --- | --- | --- | --- | --- | --- | --- |
| FFA | FFB | 40A | 40$\overline{\text{A}}$ | 40B | 40$\overline{\text{B}}$ | 40A | 40$\overline{\text{A}}$ | 40B | 40$\overline{\text{B}}$ |
| 0 | 0 | 1 | | | x | | x | 1 | |
| 1 | 0 | x | | 1 | | | 1 | | x |
| 1 | 1 | | 1 | x | | x | | | 1 |
| 0 | 1 | | x | | 1 | 1 | | x | |

The first and second input amplifiers IA and IB generally shown in FIGURE 12 comprise buffer stages for isolating the AND gate and flip-flop logic portion of the driver circuit from the input comprising the terminals CW and CCW and any additional circuitry associated therewith, as well as pulse shaping circuits to effect optimum efficiency of the input pulse signal stream FS.

Figure 14:
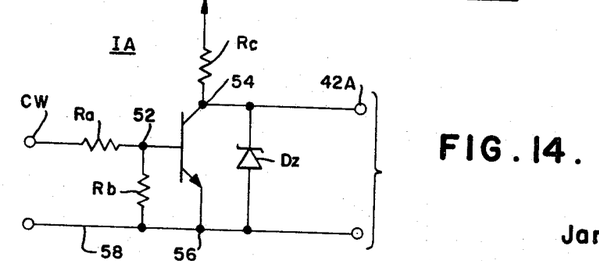
FIGURE 14 is a detailed schematic of an input amplifier circuit such as utilized in the driver circuit of FIGURE 12.

Referring to FIGURE 14, a circuit such as utilized in each of the input amplifiers IA and IB will now be described in detail, the input amplifiers IA, its associated input terminal CW and output terminal bus 42A being specifically described for the sake of example.

The first input amplifier IA includes N-P-N transistor Q1 having base, collector and emitter terminals 52, 54 and 56, respectively, the said transistor Q1 being connected in the common-emitter configuration and being adapted for operation in the switching mode by the relative values of the circuit components associated therewith.

The base terminal 52, is connected through an isolating input resistance Ra with the clockwise signal input terminal CW and to the emitter terminal 56 and common reference node or lead 58 by a resistance Rb. The collector terminal 54 is connected through a current limiting resistance Rc with a suitable source of supply voltage (not shown) and through the reverse path of a Zener diode $D_Z$ with the emitter terminal 56 and common reference node 58. The collector terminal 54 corresponds to and is directly connected with the first common signal bus 42A, the latter comprising the output terminal of the first input amplifier IA.

The Zener diode $D_Z$ limits the output pulses from the amplifier IA to a predetermined limit of voltage magnitude and thus prevents supply voltage and input signal variations from affecting the pulse waveform at the signal bus 42A. As an example, a 10 volt limit may be utilized.

An identical amplifier circuit is utilized for the second input amplifier IB.

Figure 15:
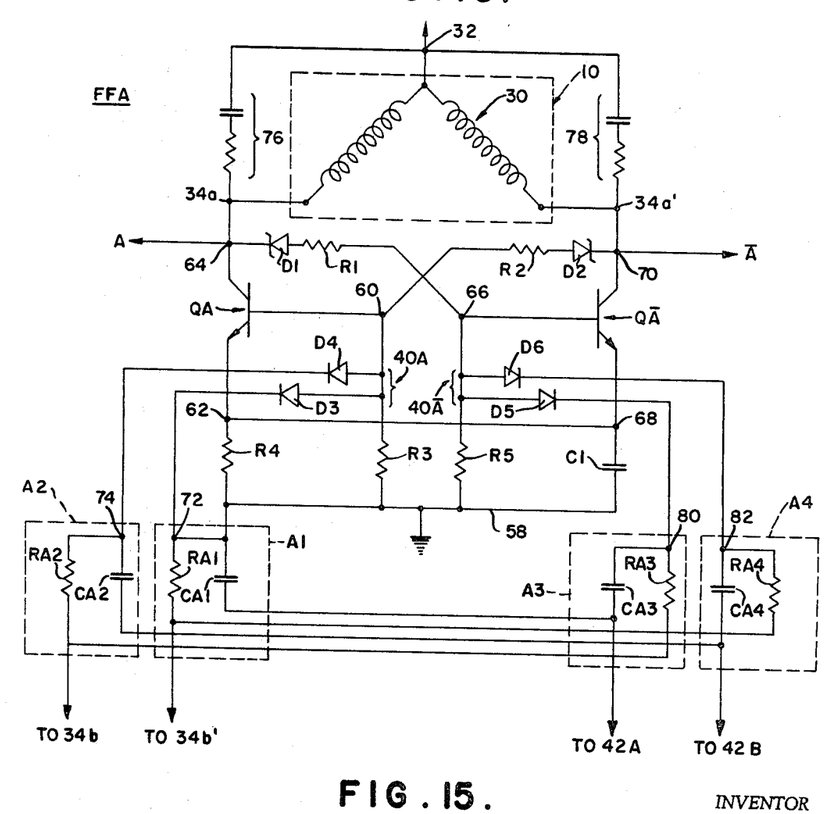
FIGURE 15 is a detailed schematic of a novel flip-flop circuit utilized in the driver circuit of FIGURE 12.

Referring now to FIGURE 15, the new and novel power flip-flop circuits utilized in the embodiment of FIGURE 13 will now be described, the first flip-flop FFA being specifically described for the sake of example, like numerals to FIGURES 12 and 14 defining like components.

The flip-flop FFA is shown as including first and second transistor means QA and $\overline{QA}$, respectively, the first having base, emitter and collector terminals 60, 62 and 64, respectively, and the second having base, emitter and collector terminals 66, 68 and 70, respectively.

The first collector terminal 64 is cross-coupled to the second base terminal 66 through a series circuit comprising the reverse current path of a first Zener diode D1, and a first coupling resistance R1.

The second collector terminal 70 is cross-coupled with the first base terminal 60 through a series circuit comprising the reverse current path of a second Zener diode D2 and second coupling resistance R2.

The first base terminal 60 is coupled through third and fourth diodes D3 and D4, respectively, with the output terminals 72 and 74 of the first and second AND gates A1 and A2, respectively, the said diodes having their anode terminals at the said first base terminal 60 and the said first base terminal 60 corresponding to the said common output terminal 40A of the first and second AND gates A1 and A2 as, previously described with reference to FIGURE 12. The first base terminal 60 is further connected through a third biasing resistance R3 with the common lead 58.

The first emitter terminal 62 is connected through a fourth biasing resistance R4 to the common power lead 58, the latter being connected directly to the output terminal 72 of the first AND gate A1.

The first and second collector terminals 64 and 70 correspond, respectively, to motor driver terminals 34a and 34a', and are connected through first and second R-C series transient suppressor networks 76 and 78, respectively, to the other common supply voltage terminal 32. The said suppressor networks are in parallel with respective halves of the windings 30 of the stepping motor 10.

The second base terminal 66 is coupled through fifth and sixth diodes D5 and D6, respectively, with the output terminals 80 and 82 of the third and fourth AND gates A3 and A4, respectively, the said diodes having their anode terminals at the said second base terminal 66 and the said second base terminal 66 corresponding to the said common output terminal $40\overline{A}$ of the third and fourth AND gates A3 and A4 as previously described with reference to FIGURE 12. The second base terminal 66 is further connected through a fifth biasing resistance R5 with the common power lead 58.

The second emitter terminal 68 is connected through a first coupling capacitance C1 to the common power lead 58.

The AND gates A1 . . . A4 comprise R-C networks RA1–CA1, RA2–CA2, RA3–CA3 and RA4–CA4, respectively, adapted to be connected in the logic network of FIGURE 12 as follows:

RA1 in series between gate output terminal 72 and driver terminal 34b';

CA1 in series between gate output terminal 72 and common bus 42A;

RA2 in series between gate output terminal 74 and driver terminal 34b;

CA2 in series between gate output terminal 74 and common bus 42B;

RA3 in series between gate output terminal 80 and driver terminal 34b;

CA3 in series between gate output terminal 80 and common bus 42A;

RA4 in series between gate output terminal 82 and driver terminal 34b; and

CA4 in series between gate output terminal 82 and common bus 42B.

An identical circuit is utilized for the second flip-flop FFB by transposition of subscripts A to B and $a$ to $b$ and vice-versa.

In operation, the flip-flop FFA (as well as FFB) comprises a power flip-flop selectively energizing the motor winding 30 without the need of power amplifier buffer stages.

The first and second Zener diodes D1 and D2 comprise control means which permit sufficient base current to flow therethrough to the second and first and second 66 and 60, respectively, whichever of the first and second transistors Qa and $\overline{QA}$ is turned on, to effect sufficient saturation for proper operation while at the same time permitting the first and second series resistors R1 and R2 to be of a relatively low power rating.

For example, should the first transistor QA be turned on, and assuming the Zener diodes D1 and D2 are selected to break down in the reverse current direction at a voltage thereacross of six (6) volts and the voltage at the first collector terminal is four (4) volts during the on state of the said first transistor QA, the first Zener diode D1 will be back biased such that no base current will flow into the second base terminal 66 of the second transistor $\overline{QA}$. In fact because of the switching mode of operation of the second transistor $\overline{QA}$ the said second transistor will be back biased in the amount of the voltage at the second emitter terminal 68 i.e., four (4) volts. Because of the positive control effect of the Zener diodes D1 and D2 the third and fifth biasing resistances R3 and R5 may be of a relatively large resistance such as in the range of ten (10) to twenty (20) kilohms.

Without the unique and novel control effect provided by the Zener diodes D1 and D2, for example, the fifth biasing resistance R5 would have to be of a much lower value of resistance to insure the cutoff of the first transistor QA. This would require the first coupling resistance R1 to be of a smaller resistance and a higher power rating to provide sufficient on-time base current to the second transistor $\overline{QA}$, resulting in a fifty percent (50%) increase in the current drawn through the "off" half of the motor winding 30, resulting in an unnecessary power drain on the system. Thus, the Zener diodes D1 and D2 effect a more efficient operation of the flip-flop FFA.

Assuming a twenty (20) volt power supply voltage and a ten (10) volt amplitude of all signal pulses IS, A, $\overline{A}$ B and $\overline{B}$, typical voltage relationships and control of the on and off states of the first and second transistors QA and Q$\overline{A}$ are as follows:

Assuming the first transistor QA is turned on, a positive state of the driver signal B at the third driver terminal 34b and a corresponding potential of five (5) volts is constrained upon the fourth driver terminal 34b' by the circuit parameters of the system of FIGURE 12, the output terminal 74 of the second AND gate A2 will be at supply potential, back biasing the fourth diode D4 and preventing negative signal pulses of less than twenty (20) volts from reaching the first base terminal 60 of the first transistor QA if there is any input signal IS at the counter-clockwise input bus 42B.

However, the five volt negative constraint on the fourth driver terminal 34b' effects a five volt negative potential at the output terminal 82 of the fourth AND gate A4. Since the second transistor Q$\overline{A}$ is on and back biased in the amount of a positive four (4) volts as previously described, a negative voltage transition exists from the terminal 40$\overline{A}$ (second base terminal 66) in the forward direction of the sixth diode D6 to the said output terminal 82 of the fourth AND gate A4 which is differentiated by the capacitance CA4, shunting the base current from the second base terminal 66 and turning off the second transistor Q$\overline{A}$.

Thus, the signal potential $\overline{A}$ appears at the second collector terminal 70 (and second driver terminal 34a'), energizing the corresponding half of the motor winding 30 and causing the second Zener diode D2 to break down, apply base current to the first base terminal 60 and turn on the first transistor QA.

In like manner, other permutations and combinations of input signals to the AND gates A1, A2, A3 and A4 will result in either a reversal of the state of the flip-flop FFA or a maintenance of a given state thereof.

*Time-duration contact closure multivibrator circuit*

Figure 16:
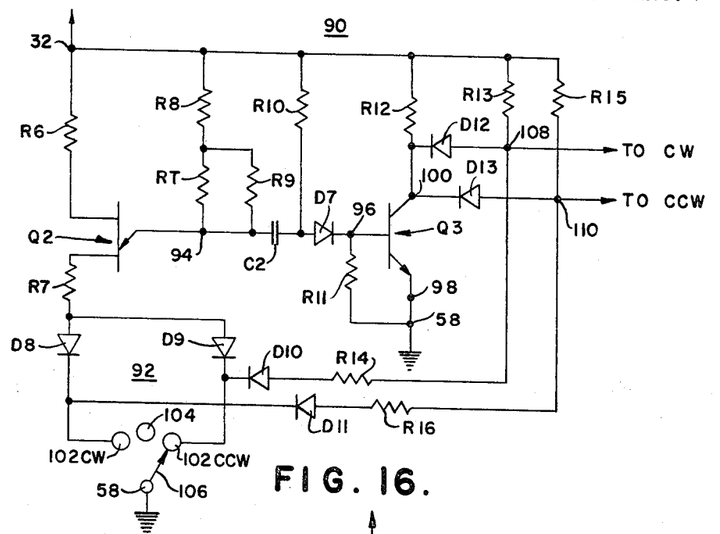
FIGURE 16 is a detailed schematic of a multivibrator circuit utilized in a first time-duration contact closure input mode of operation of the driver circuit of FIGURE 12.

Referring to FIGURE 16, a multivibrator circuit and selective control means 90 of the present invention for effecting operation of the logical driver circuit of FIGURE 12 in a time-duration contact closure mode will now be described.

The multivibrator portion of the circuit 90 is a conventional unijunction transistor and transistor type having R-C coupling and includes a unijunction transistor Q2 and an output transistor Q3 controlled thereby. The conductive path of the unijunction transistor Q2 is connected in series across the power leads 32 and 58 between sixth and seventh series resistance means R6 and R7, respectively, the former being connected on one side to the positive power lead 32 and the latter being connected on one side to the ground or common power lead 58 through a contact closure network 92, to be hereinafter more fully described.

The control terminal 94 of the unijunction transistor Q2 is connected htrough a timing capacitor C2 and a blocking diode D7 to the base terminal 96 of the output transistor Q3, the diode D7 having its anode at the capacitor C2 and its cathode at the base terminal 96 to prevent negative transients from damaging the output transistor Q3.

Frequency compensation with respect to temperature changes is provided by a resistive voltage divider network connected from the positive power lead 32 to the control terminal 94 of the unijunction transistor Q2, the said network comprising eighth and ninth series resistances R8 and R9, respectively, with the ninth resistance R9 being shunted by a thermistor means RT, the latter two each having one side thereof connected at the said control terminal 94.

A tenth resistance R10 is connected from the positive power lead 32 to the anode of the blocking diode D7; an eleventh resistance R11 is connected from the base termnal 96 of the output transistor Q3 to the common lead 58, the latter being coincident with the emitter terminal 98 of the said output transistor Q3; and a twelfth resistance R12 is connected from the positive power lead 32 to the collector terminal 100 of the output transistor Q3 to complete the multivibrator portion of the circuit 90.

The contact closure network 92 comprises eighth and ninth diodes D8 and D9, respectively, connected at their anodes to one end of the seventh resistance R7 and at their cathodes to clockwise and counter-clockwise control terminals 102CW and 102CCW, respectively. A neutral or OFF control terminal 104 is also provided, all of said control terminals being selectively connectable to the common power lead 58 via a selective control contact 106.

Selective application of output pulses from the collector 100 to either the clockwise input CW or counter-clockwise input CCW of the logical driver circuit of FIGURE 12 is effected by a resistance and diode output network including a first circuit branch comprising a thirteenth resistance R13 connected from the positive power lead 32 to a first circuit junction 108, and a series fourteenth resistance R14 connected from the first junction 108 to the anode of a tenth diode D10, the cathode of the latter being connected at the counterclockwise control terminal 102CCW; and further including a second circuit branch comprising a fifteenth resistance R15 connected from the positive power lead 32 to a second circuit junction 110, and a series sixteenth resistance R16 connected from the second junction 110 to the anode of an eleventh diode D11, the cathode of the latter being connected at the clockwise control terminal 102CW.

The first circuit junction 108 is connected to the collector terminal 100 of the output transistor Q3 via the anode-cathode path of a twelfth diode D12 while the second circuit junction 110 is connected to the said collector terminal 100 via the anode-cathode path of a thirteenth diode D13 to complete the output network of the circuit 90.

In operation, when the moving control contact 106 is engaged with the neutral contact 104, no conductive path can exist between the positive power lead 32 and common lead 58 through the unijunction transistor Q2. Spurious oscillations are prevented in this OFF state of the contact closure network 92 by the eighth and ninth diodes D8 and D9 which prevent current flow in the said unijunction transistor Q2 in the said OFF state of the said network 92.

If the moving control contact 10b is engaged with the counter-clockwise control contact 102CCW, a current path is completed through the unijunction transistor Q2 via the sixth and seventh resistances R6 and R7 and the ninth diode D9, causing the multivibrator portion of the circuit 90 to generate a train or stream of pulses at the collector terminal 100 of the transistor Q3 in a conventionally known manner. At this time, as shown in FIGURE 16, a current path also exists from the positive lead 32 through the thirteenth resistance R13, fourteenth resistance R14, tenth diode D10 and counter-clockwise control contact 102CCW to the common lead 58, forward biasing the said tenth diode D10. The fourteenth resistance R14 is very small such that the voltage drop is substantially equal to the collector-to-emitter voltage of the output transistor Q3, thereby maintaining the first junction 108 at a very low constant potential. However, the thirteenth diode D13 is forward biased during the ON time of the transistor Q3 through the current path including the fifteenth resistance R15, collector terminal 100 and emitter terminal 98, causing the on-off action of the output transistor Q3 to effect a train or stream of output pulses at the second junction 110, which, as indicated is adapted to be connected to the counter-clockwise input terminal CCW of the logical driver circuit of FIGURE 12.

If the moving control contact 106 is shifted to the clockwise control contact 102CW of the contact closure circuit 92, the sixteenth resistance R16 is also of a small value, holding the second junction 110 at a low constant potential and causing the twelfth diode D12 to be forward biased through the thirteenth resistance R13, whereby a stream or train of output pulses is effected at the first junction 108, the latter corresponding to the clockwise input terminal CW of the logical driver circuit of FIGURE 12.

Thus, a system is provided whereby, depending upon the frequency of the output of the circuit 90 as determined by the timing capacitor C2, and the duration of closure of the moving control contact 106 with the clockwise or counterclockwise control contacts 102CW or 102CCW, respectively, a predetermined number of steps of the stepping motor 10 can be effected in a selected direction of rotation by the logical driver circuit of FIGURE 12.

*Line-frequency mode of time-duration contact closure operation and pulse generating circuit means for same*

Figure 17:
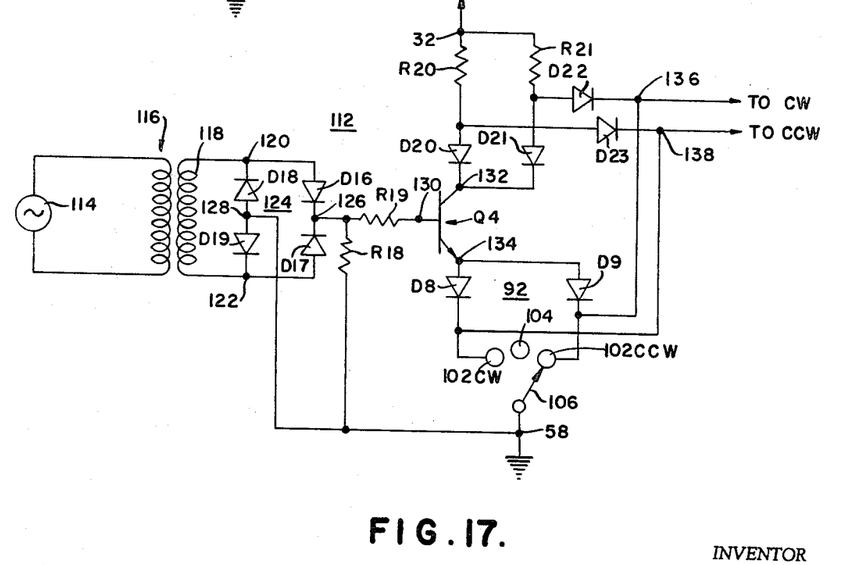
FIGURE 17 is a detailed schematic of a pulse generator circuit utilized in a second time-duration contact closure input mode of operation of the driver circuit of FIGURE 12.

If it is desired to utilize pulses controlled by the line frequency of an A.C. source, the pulse generator circuit 112 of FIGURE 17, now to be described, may be utilized in lieu of the multivibrator circuit means 90 of FIGURE 16.

The pulse generator circuit 112 is shown as including the contact closure circuit 92 and the positive and common power leads 32 and 58, respectively.

An alternating current source 114 provides a line frequency energization of the pulse generator circuit 112 through a power transformer 116, the latter including a secondary winding 118. The input terminals 120 and 122 of a full wave rectifier bridge 124 are connected across the secondary winding 118 of the power transformer 116, the said rectifier bridge 124 further including first and second rectifier output terminals 126 and 128, respectively, the latter being directly connected to the common power lead 58.

The first rectifier output terminal 126 is common to the cathodes of sixteenth and seventeenth diodes D16 and D17 connected in series opposition across the secondary 118 as shown and the second rectifier output terminal 128 is common to the anodes of eighteenth and nineteenth diodes D18 and D19 connected in series opposition across the secondary 118, the said second terminal 128 providing a reference for the rectified output pulses of the rectifier bridge 124.

If desired, one or the other of the sixteenth and seventeenth diodes D16 and D17 may be removed to provide a pulse frequency equal to the line frequency of the A.C. source 114, or if both said diodes D16 and D17 are left in the bridge 124, the pulse frequency will be twice that of the line frequency.

The rectified pulses appear across an eighteenth input resistance R18, connected between the rectifier output terminals 126 and 128 and are fed from the first rectifier output terminal 126 through a coupling nineteenth resistance R19 to the base terminal 130 of a transistor Q4, the latter including collector and emitter terminals 132 and 134, respectively.

The emitter terminal 134 is commonly connected to the anodes of the eighth and ninth diodes D8 and D9 of the contact closure network 92.

The collector terminal 132 is commonly connected to the cathodes of twentieth and twenty-first diodes D20 and D21 which are respectively connected from their anodes to the positive power lead 32 through twentieth and twenty-first resistances R20 and R21.

Clockwise control designation output pulses are effected at a first output terminal 136 comprising the cathode terminal of a twenty-second diode D22, the latter having its anode terminal common with the anode terminal of the twenty-first diode R21 and the said first output terminal 136 being directly connected to the counter-clockwise control contact 102CCW.

Counter-clockwise control designation output pulses are effected at a second output terminal 138 comprising the cathode terminal of a twenty-third diode D23, the latter having its anode terminal common with the anode terminal of the twentieth diode D20 and the said second output terminal 138 being directly connected to the clockwise control contact 102CW.

As shown, the first and second output terminals 136 and 138 of the pulse generator circuit 112 are adapted to be directly connected to the clockwise and counter-clockwise input terminals CW and CCW, respectively, of the logical driver network of FIGURE 12.

In operation, the engagement of the moving contact 106 of the contact closure network 92 with the neutral or OFF contact 104 precludes conduction in the transistor Q4, the emitter terminal 134 being open circuited.

If the moving contact 106 is engaged with the counter-clockwise control contact 102CCW then the emitter terminal 134 is connected through the anode-cathode path of the ninth diode D9 to the common supply lead 58 and the collector terminal 132 is connected with the positive power lead 32 as above-described.

Thus, the line frequency input pulses being continuously supplied to the base terminal 130 will cause the transistor Q4 to effect amplified output pulses at the anodes of the twentieth and twenty-first diodes D20 and D21 and forward bias the twenty-second and twenty-third diodes D22 and D23. The twenty-second diode D22 will shunt the output pulses to the common power lead 58 via the first output terminal 136, counter-clockwise control contact 102CCW and moving contact 106 precluding the appearance of output pulse voltages at the said first output terminal 136. The twenty-third diode D23, however, is connected to the clockwise control contact 102CW which is open-circuited, thereby causing the output pulse voltages to appear at the second output terminal 138, corresponding to the counter-clockwise input terminal CCW of the logical driver network of FIGURE 12, thereby effecting the counter-clockwise input constraint on the latter as selected by the above-designated position of the moving contact 106 in the contact closure network 92.

If the contact 106 is now moved to engage the clockwise control contact 102CW, the output pulse voltages will be shunted to ground at the second output terminal 138 and the twenty-second diode D22 connected to the now open-circuited counter-clockwise control contact 102CCW, will now effect output pulse voltages at the first output terminal 136, corresponding to the clockwise input terminal CW of the logical driver network of FIGURE 12, thereby effecting the clockwise input constraint on the latter as selected by the above-designated position of the moving contact 106 in the contact closure network 92.

It is now readily seen from the pulse timing chart of FIGURE 13 and the motor input permutations previously set forth in FIGURE 6 in conjunction with the pulse timing chart of FIGURE 5, that the selection of a clockwise or counter-clockwise input state or constraint for the logical driver network of FIGURE 12 by any suitable control means for a duration functionally related to the value of an input variable being monitored and responded to by the stepping motor 10 will produce clockwise or counter-clockwise rotational steps of the said motor 10 of a number in direct proportion to the duration of a particular input state, the logical driver network of FIGURE 12 performing the said polarity permutations of the pole pieces in the stepping motor 10 in either a clockwise or counter-clockwise sequence in response to the particular input state or constraint imposed thereon.

Thus, it becomes readily apparent that the present invention satisfies a long felt need in the art for a high response rate stepping motor having minimized power input requirements and optimized torque output over a speed (stepping pulse rate) range for which it is designed.

The present invention further satisfies a need in the art for compatible input and driver circuits and systems for stepping motor energization operable in a variety of input modes by direct control of stepping motors in response to digital type outputs is readily effected. Additionally, the present invention provides new and novel logical driver network means and circuits effecting a power and eliminating the need for additional power output stages.

It is to be understood that the particular embodiment of the invention shown and described herein is for the purpose of example only and is not intended to limit the scope of the appended claims.

What is claimed is:

1. A rotary stepping motor comprising a rotor; a stator including first and second pole pieces and permanent magnet means interconnecting said pole pieces, said pole pieces and said magnet means being mutually concentric with said rotor; a plurality of symmetrically spaced, axially extending radial rotor teeth on the periphery of said rotor; an even number of radial salient poles arranged in diametrically opposed complementary pairs on each of said pole pieces, similar complementary pairs in respective ones of said pole pieces being in axial alignment; first and second pole groups comprising, respectively, alternate ones of said complementary pairs of salient poles on each of said pole pieces; a like plurality of radial, axially extending stator teeth on each of said pole pieces having the same relative symmetrical spacing as said rotor teeth on each of said pole pieces; said stator teeth and said rotor teeth being adjacently and oppositely located to form an air gap therebetween; first and second winding means on said first and second pole pieces, each of said winding means comprising first and second pole pieces, each of said winding means comprising first and second winding portions associated, respectively, with a like one of the said pole groups, respectively, on said first and second pole pieces, the said like pole groups on said pole pieces being respectively wound in magnetic opposition; both said winding means having a mutually common input terminal and first and second selective input terminals for said first and second winding portions thereof, respectively; and said complementary pairs of salient poles being positioned on said stator such that the stator teeth on at least one of said complementary pairs on each pole piece are aligned with the respectively adjacent rotor teeth, the stator teeth on at least a second of said complementary pairs on each pole piece are out of alignment with the respectively adjacent rotor teeth and the stator teeth on at least a third of said complementary pairs on each pole piece are partially aligned with the respectively adjacent rotor teeth.

2. The invention defined in claim 1, wherein said stator teeth on at least a said first and second complementary pair are substantially fully aligned and substantially fully out of alignment, respectively, with the said adjacent rotor teeth and the said stator teeth on said at least one complementary pair in the said other of said pole groups are substantially one-half aligned with the said adjacent rotor teeth.

3. The invention defined in claim 1, wherein each of said first and second pole groups comprises first and second complementary pairs of salient poles; and wherein, on each of said pole pieces the stator teeth on said first and second complementary pairs of one of said pole groups are substantially fully aligned and substantially fully out of alignment, respectively, with the adjacent rotor teeth, and the stator teeth on said first and second complementary pairs of the other of said pole groups are substantially one-half out of alignment with the adjacent rotor teeth.

4. The invention defined in claim 3, wherein the stator teeth on said first and second complementary pairs of said other of said pole groups are in leading and lagging relationship, respectively, with the adjacent rotor teeth and vice-versa for clockwise and counterclockwise rotation, respectively, of said rotor teeth with respect thereto.

5. A rotary stepping motor comprising a rotor; a stator including first and second pole pieces mutually concentric with said rotor and permanent magnet means effecting a magnetic circuit between said stator and said rotor including first and second air gaps between said rotor and said first and second pole pieces, respectively, a plurality of radial, symmetrically spaced rotor teeth adjacent and common to both said air gaps; a like plurality of diametrically opposed pairs of radial salient poles on each of said pole pieces, like complementary pairs on respective ones of said pole pieces being in axial alignment; first and second pole groups comprising, respectively, alternate ones of said complementary pairs of salient poles on each of said pole pieces, like complementary pairs in like pole groups on said first and second pole pieces, respectively, being of opposite magnetic polarity, and adjacent complementary pairs in each pole group being of opposite magnetic polarity; said poles including winding means effecting said respective magnetic polarities; a like plurality of stator teeth on each of said pole pieces adjacent said rotor teeth across said air gap therefrom, said stator teeth having the same relative symmetrical spacing as said rotor teeth on each of said pole pieces; and said complementary pairs of salient poles being positioned on said stator such that on each pole piece the stator teeth on at least a first and second complementary pair in one of said pole groups are aligned and not aligned, respectively, with the adjacent rotor teeth and the stator teeth on at least one complementary pair in the other of said pole groups are partially aligned with the adjacent rotor teeth.

6. The invention defined in claim 5, wherein said stator teeth on at least a said first and second complementary pair are substantially fully aligned and substantially fully out of alignment, respectively, with the said adjacent rotor teeth, and the said stator teeth on said at least one complementary pair in the said other of said pole groups are substantially one-half aligned with the said adjacent rotor teeth.

7. The invention defined in claim 5, wherein each of said first and second pole groups comprises first and second complementary pairs of salient poles; and wherein, on each of said pole pieces the stator teeth on said first and second complementary pairs of one of said pole groups are substantially fully aligned and substantially fully out of alignment, respectively, with the adjacent rotor teeth, and the stator teeth on said first and second complementary pairs of the other of said pole groups are substantially one-half out of alignment with the adjacent rotor teeth.

8. The invention defined in claim 7, wherein the stator teeth on said first and second complementary pairs of said other of said pole groups are in leading and lagging relationship, respectively, with the adjacent rotor teeth and vice-versa for clockwise and counterlockwise rotation, respectively, of said rotor teeth with respect thereto.

9. A rotary stepping motor comprising a rotor; a stator including pole piece means concentric with said rotor and separated therefrom by an air gap and permanent magnet means effecting a magnetic circuit through said stator, rotor and air gap; a plurality of symmetrically spaced radial rotor teeth on said rotor adjacent said air gap; and a plurality of complementary, diametrically opposed pairs of radial salient poles on said pole piece means, each said salient pole including a like plurality of radial stator teeth adjacent said air gap having the same relative symmetrical spacing as said rotor teeth; winding means on said salient poles effecting opposite magnetic polarities of adjacent poles; said complementary pairs being positioned on said pole piece means such that the stator teeth on a certain of said complementary pairs are aligned with the adjacent rotor teeth, the stator teeth on certain other of said complementary pairs are out of alignment with the adjacent rotor teeth and the stator teeth on certain other of said complementary pairs are partially aligned with the adjacent rotor teeth.

10. The invention defined in claim 9, wherein said stator teeth on said certain complementary pairs are substantially fully aligned with the adjacent rotor teeth, the stator teeth on the first recited of said certain other complementary pairs are substantially fully out of alignment with the adjacent rotor teeth and the stator teeth on the last recited of said certain other complementary pairs are substantially one-half aligned with the adjacent rotor teeth.

11. The invention defined in claim 9 wherein said complementary pairs are divided into first and second pole groups, and said winding means includes first and second winding groups, respectively, for said first and second pole groups; and wherein one of said pole groups is comprised of said complementary pairs having said stator teeth aligned and out of alignment with said adjacent rotor teeth and the other of said pole groups is comprised of said complementary pairs having said stator teeth partially aligned with said adjacent rotor teeth.

12. The invention defined in claim 11, wherein said other of said pole groups, the stator teeth on certain and certain other said complementary pairs are in leading and lagging relationship, respectively, to said adjacent rotor teeth and vice-versa for clockwise and counterclockwise rotation, respectively, of said rotor teeth with respect thereto.

13. The invention defined in claim 9, wherein said pole piece means includes first magnetic means concentric with said rotor at oe end thereof and second magnetic means carrying said radial salient poles concentrically disposed at the other end of said rotor.

14. The invention defined in claim 9, wherein said pole piece means includes first magnetic means concentric with said rotor at oe end thereof and second magnetic means carrying said radial salient poles concentrically disposed at the other end of said rotor; and wherein said stator teeth on said certain complementary pairs are substantially fully aligned with the adjacent rotor teeth, the stator teeth on the first recited of said certain other complementary pairs are substantially fully out of alignment with the adjacent rotor teeth and the stator teeth on the last recited of said certain other complementary pairs are substantially one-half aligned with the adjacent rotor teeth.

15. The invention defined in claim 9, wherein said pole piece means includes first magnetic means concetric with said rotor at one end thereof and second magnetic means carrying said radial salient poles concentrically disposed at the other end of said rotor; wherein said complementary pairs are divided into first and second pole groups, and said winding means includes first and second winding groups, respectively, for said first and second pole groups; and wherein one of said pole groups is comprised of said complementary pairs having said stator teeth aligned and out of alignment with said adjacent rotor teeth and the other of said pole groups is comprised of said complementary pairs having said stator teeth partially aligned with said adjacent rotor teeth.

16. The invention defined in claim 15, wherein said other of said pole groups, the stator teeth on certain and certain other said complementary pairs are in leading and lagging relationship, respectively, to said adjacent rotor teeth and vice-versa for clockwise and counterclockwise rotation, respectively, of said rotor teeth with respect thereto.

17. The invention defined in claim 9, wherein said winding means comprises first and second winding skeins each having first and second input terminals and a center tap wound, respectively, on first and second groups of said salient poles, said groups each comprising alternate adjacent ones of said salient poles.

References Cited

UNITED STATES PATENTS

| 2,499,316 | 2/1950 | Johson | 310—49 |
| 2,844,316 | 7/1958 | Liebknecht | 310— 49 XR |
| 2,864,018 | 12/1958 | Aeschmann | 310—49 |
| 2,917,699 | 12/1959 | Grant | 310—154 XR |
| 2,968,755 | 1/1961 | Baermann | 310—154 XR |
| 3,024,399 | 3/1962 | Valentino | 310—49 XR |
| 3,206,623 | 9/1965 | Snowdon | 310—49 |
| 3,293,459 | 12/1966 | Kreuter et al. | 310—49 |
| 3,343,014 | 9/1967 | Giles | 310—49 |

ORIS L. RADER, *Primary Examiner.*

GLEN SIMMONS, *Assistant Examiner.*

U.S. Cl. X.R.

310—154, 254